United States Patent
Sander

(10) Patent No.: US 7,286,285 B2
(45) Date of Patent: Oct. 23, 2007

(54) SURGICAL MICROSCOPE HAVING AN OBJECT FIELD ILLUMINATION SYSTEM

(75) Inventor: Ulrich Sander, Rebstein (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 51 days.

(21) Appl. No.: 10/794,997

(22) Filed: Mar. 5, 2004

(65) Prior Publication Data

US 2004/0174592 A1 Sep. 9, 2004

(30) Foreign Application Priority Data

Mar. 7, 2003 (DE) .............................. 103 09 971

(51) Int. Cl.
  *G02B 21/06* (2006.01)
(52) U.S. Cl. .................. 359/385; 359/568; 369/112.03
(58) Field of Classification Search ................ 359/368, 359/384–388, 566–576; 369/112.03–112.15
See application file for complete search history.

(56) References Cited

U.S. PATENT DOCUMENTS

| | | | | |
|---|---|---|---|---|
| 5,181,211 A | * | 1/1993 | Burnham et al. | 372/21 |
| 5,449,882 A | * | 9/1995 | Black et al. | 219/121.83 |
| 5,815,293 A | * | 9/1998 | Komma et al. | 359/19 |
| 5,865,829 A | * | 2/1999 | Kitajima | 606/3 |
| 6,079,256 A | * | 6/2000 | Bareket | 73/105 |
| 2002/0087149 A1 | * | 7/2002 | McCary | 606/4 |
| 2002/0133146 A1 | * | 9/2002 | Telfair et al. | 606/5 |
| 2002/0159146 A1 | | 10/2002 | Leimbach et al. | |
| 2005/0107773 A1 | * | 5/2005 | Bergt et al. | 606/4 |

FOREIGN PATENT DOCUMENTS

| | | |
|---|---|---|
| DE | 10100857 | 8/2002 |
| EP | 0 075 860 A2 | 4/1983 |
| EP | 1 231 496 A2 | 8/2002 |

OTHER PUBLICATIONS

Poleshchuk, Alexander G., "Diffractive light attenuators with variable transmission", Journal of Modern Optics, 1998, vol. 45, No. 7, 1513-1522, Institute of Automation and Electrometry, Russian Academy of Science, Novosibirsk, 630090, Russia.

Topag Lasertechnik GmbH, "Diffractive Variable Attenuators for High Power Lasers", (publication date unknown), Darmstadt, 2 pages, also published in "Physik Journal" 1(2002) No. 10 page 61.

* cited by examiner

*Primary Examiner*—Joshua L Pritchett
(74) *Attorney, Agent, or Firm*—Hodgson Russ LLP

(57) ABSTRACT

The invention concerns a surgical microscope (2, 3, 5) having a novel laser illumination system (11) and, in a preferred embodiment, an arrangement in which a diffractive element (7) produces an additional illuminating beam and a measurement beam.

17 Claims, 5 Drawing Sheets

SURGICAL MICROSCOPE HAVING AN OBJECT FIELD ILLUMINATION SYSTEM

CROSS REFERENCE TO RELATED APPLICATIONS

This application claims priority of the German patent application 103 09 971.9 filed Mar. 7, 2003 which is incorporated by reference herein.

FIELD OF THE INVENTION

The invention concerns a surgical microscope having an object field illumination system.

BACKGROUND OF THE INVENTION

A "surgical microscope" is to be understood, for purposes of the invention, as a surgical microscope for magnified visual depiction of an object field for an observer using an eyepiece.

A wide variety of light sources are used to illuminate the object field in surgical microscopes, for example halogen lamps, incandescent lamps, discharge lamps. The use of laser diodes for analysis, diagnosis, and therapy (e.g. retinal treatments) is common at present. Lasers are also known for control and measurement purposes on surgical microscopes, e.g. for automatic focusing.

Lasers are unknown, however, for illumination purposes as a light source for object field illumination in surgical microscopes. The disadvantage arising therefrom is that alongside a laser for the aforesaid analytical and diagnostic purposes, a conventional illumination system is additionally necessary.

SUMMARY OF THE INVENTION

Resulting therefrom is a first partial object upon which the invention is based.

This partial object is achieved by making available a laser having suitable light output as a light source for an object field illumination system.

In order to achieve appropriate illumination intensities in the object field, lasers having a relatively high power level must therefore be used. In the context of similarly intense high-output lamps and discharge lamps, it is known on the one hand that regulation of the illumination intensity leads to problems with heat dissipation when absorption filters are used; and on the other hand that with pinholes, which are more temperature-stable, their hole structure is imaged in the illuminated field. Lasers, in contrast, are advantageous because their actual light source can be located relatively remotely from the surgical microscope, and the heat evolution of the light source is thus likewise remote. If the laser beam needs to be attenuated in the region of the surgical microscope, however, problems comparable to those with high-output lamps and discharge lamps usually occur.

To eliminate these disadvantages while simultaneously equipping a surgical microscope with a high-power, controllable illumination system, the second partial object that presented itself was thus that of finding a laser illumination system which meets the specific operating requirements of a surgical microscope.

The inventor has recognized that the use and the integration according to the present invention of a high-power laser, in combination with a so-called diffractive beam attenuator, into a surgical microscope offers a good way to achieve the stated second partial object. Such diffractive beam attenuators have not hitherto been used for illumination purposes. According to the present invention, monochromatic or white-light lasers can be used.

By means of a controllable diffractive beam attenuator, the light intensity in the (zero-order) illuminating beam can be regulated in the illuminating beam itself without heat dissipation problems. The reason for this is that light quantities that have been diffracted and thus subtracted energetically from the illuminating beam can be annihilated in absorbers that can be placed at suitable locations at which any heat generation is not troublesome.

Diffractive beam attenuators for high-power lasers—for example that of TOPAG Lasertechnik GmbH, Darmstadt, cf. TOPAG information sheet: "Diffractive Variable Attenuators for High Power Lasers," 2 pages, publication date unknown; also published in "Physik Journal" 1 (2002) no. 10, page 61—have hitherto been used in the following sectors: material handling or processing (e.g. marking or surface scanning), laser applications, photometry, optical research, and in holographic applications, but not for illumination regulation of an object field illumination system in a surgical microscope.

The inventor has recognized, in particular, that irrespective of these specific laser applications, in the event a laser is used, the beam attenuation system and, in particular, its controllability by means of a diffractive optical element can be utilized optimally for illumination of a surgical microscope.

The operating principle of the aforementioned diffractive beam attenuator is that by diffraction of an input beam $I_{input}$ (beam from the laser light source), the maximum intensity of input beam $I_{input}$ is split into a remaining residual beam $I_{output}$ and into beams diffracted into the +/− first order or higher orders. Diffractions of +/− second and +/− third and higher orders are not preferred. In one of the exemplary embodiments, the diffracted beams are annihilated in an absorber; output beam $I_{output}$ is constituted from the correspondingly attenuated input beam $I_{input}$. A regulated residual beam $I_{output}$ is thus available, depending on the selection of the diffractive structure. The intensity of this beam can be regulated from $I_{max}=I_{input}$ (for the case of no diffraction) to $I_{min}\approx 0$. Stepless regulation is possible with the use of appropriate diffractive structures. Reference is made at www.topag.de to the embodiment of the diffractive elements. Those skilled in the art of laser engineering are also familiar, however, with other methods for diffractive beam attenuation that are likewise usable in the context of the invention (e.g. blaze gratings).

The integration, according to the present invention, of a laser and a diffractive component into a surgical microscope thus makes available a high-power, controllable illumination system.

The inventor has, however, additionally recognized that the diffracted beams of +/− first or higher order need not necessarily be annihilated, but rather can be considered as additional illumination. A preferred embodiment of the invention thus provides for an optionally introducible direct lateral object illumination using a first-order illuminating beam.

A further preferred embodiment of the invention measures one of the diffracted beams of +/− first or higher order by means of a sensor, and thus provides a direct indication as to the intensity of the zero-order (main) illuminating beam. Provision is optionally made for this measurement information to be presented on a display, which optionally can be reflected into the field of view of the observer looking through the eyepieces, as he or she desires, at a favorable location in the surgical microscope.

Further embodiments of the invention are shown in the Figures and covered in the dependent claims.

The Parts List is a constituent of the disclosure.

BRIEF DESCRIPTION OF THE DRAWINGS

The invention will be explained further, symbolically and by way of example, with reference to the schematic Figures. The Figures are described in continuous and overlapping fashion. Identical reference characters denote identical components; reference characters having different indices indicate similar or functionally identical components. In the Figures.

DETAILED DESCRIPTION OF THE INVENTION

Figure 1:
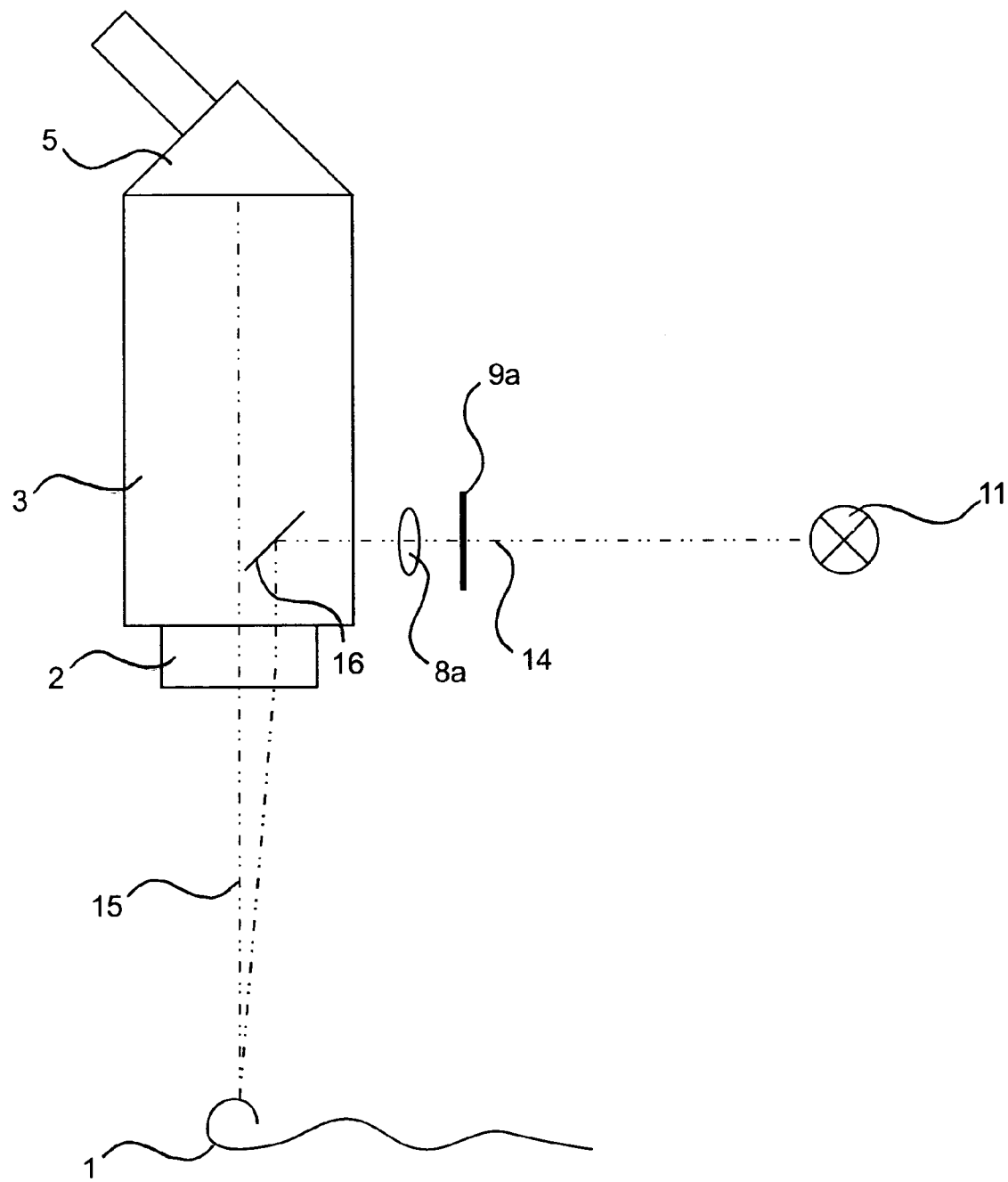
FIG. 1 shows a configuration of a surgical microscope having a laser light source as illumination system.

FIG. 1 shows the configuration of a surgical microscope 3 having a tube 5 with eyepieces. Axis 15 of a main objective 2 is simultaneously depicted as the main axis of surgical microscope 3. Illuminating beam 14 deriving from a laterally arranged laser light source 11 can be pulsed or closed by means of an optionally arranged shutter 9a. The shutter is shown in the vicinity of surgical microscope 3, but it could also be arranged remotely from it in order to keep any thermal problems away from surgical microscope 3.

An illuminating optical system 8a, depicted representatively by means of a lens symbol, influences the illuminating beam geometry. This element can comprise an optical system that widens the collimated laser beam 14, or a pinhole arrangement; and after deflection by deflection element 16 it images the illuminating light onto object field 1.

A scanning device that scans the laser beam over object field 1, and thus produces full-area illumination without imaging optics, could also be provided instead of illuminating optical system 8a.

Figure 2:
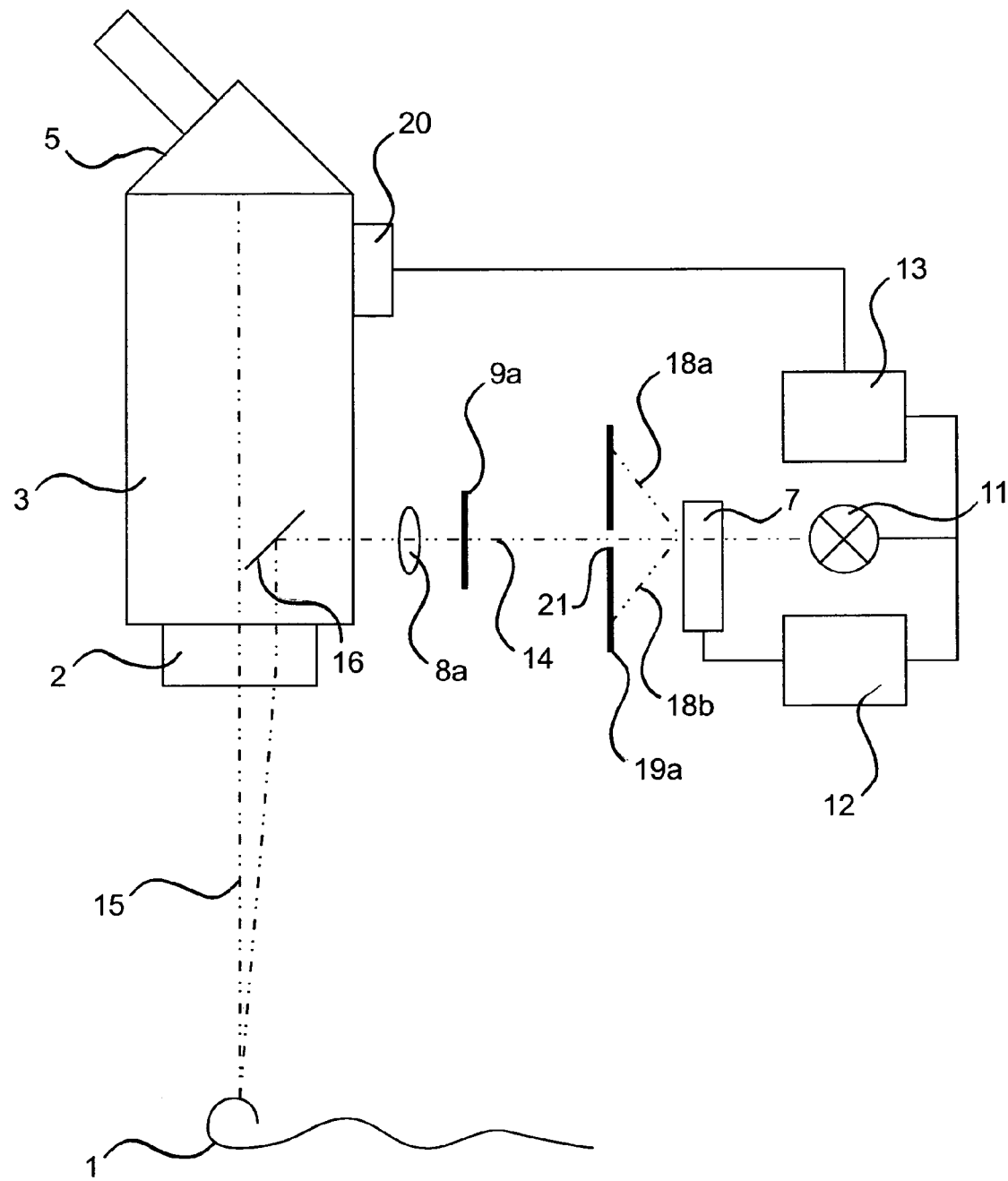
FIG. 2 shows the configuration of FIG. 1 into which a diffractive beam splitter is integrated and in which both (all) diffracted beams are annihilated.

In FIG. 2, the configuration according to FIG. 1 is supplemented by the integration of a diffractive element 7 into illuminating beam 14. An illuminating beam 14 is provided through an opening 21 of absorber 19a, as in FIG. 1, for object field illumination through main objective 2. The diffracted beams of +/- first or higher order, symbolically depicted by axes 18a and 18b, are absorbed in absorber 19a. By means of a manual or electronic control system 20 arranged on surgical microscope 3, the output power of laser light source 11 can be influenced by way of an electronic data processing system 13, and/or diffractive element 7 can be regulated, for light attenuation, by way of a driving system 12. Connecting leads are labeled 22a-c.

Figure 3:
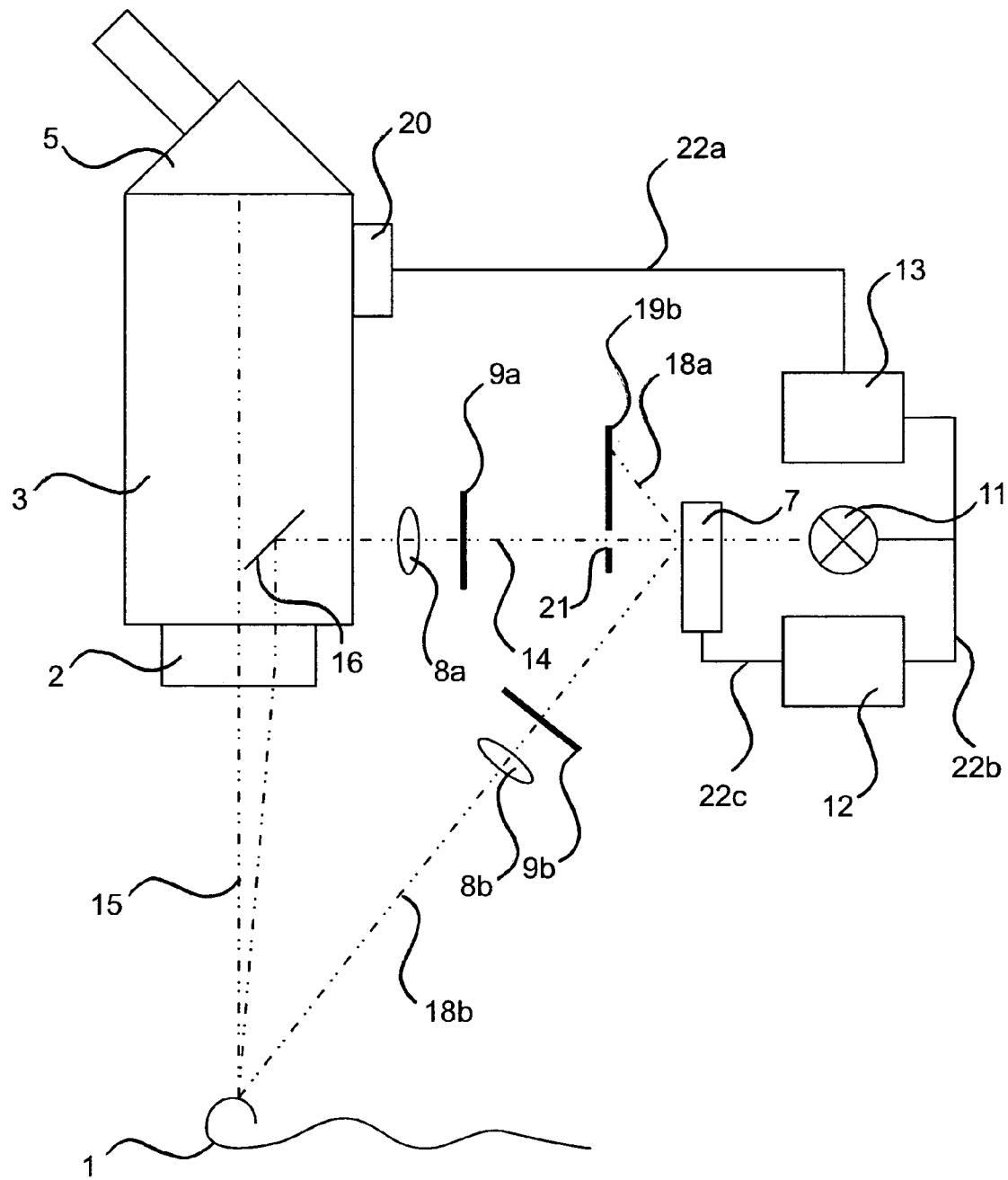
FIG. 3 shows the configuration according to FIG. 2 in which one symmetrical half of the diffracted beams is annihilated and the other provides additional direct object illumination.

FIG. 3 shows the same arrangement as in FIG. 2, except that in this development according to the present invention a portion of the diffracted beams of first or higher order (plus or minus, depicted e.g. by axis 18b) is provided for additional direct object illumination. Similarly to (main) illuminating beam 14, this first-order illuminating beam 18b is also optionally equipped with a shutter 9b and an imaging illuminating optical system 8b or a scanning device.

Multi-beam illumination can be achieved with this arrangement by the fact that the +/- first- or higher-order beam having axis 18b is not annihilated by the absorber. Object 1 that is to be illuminated can thus be simultaneously and selectably illuminated at various angles, utilizing absorbing shutters 9a and 9b.

Figure 4:
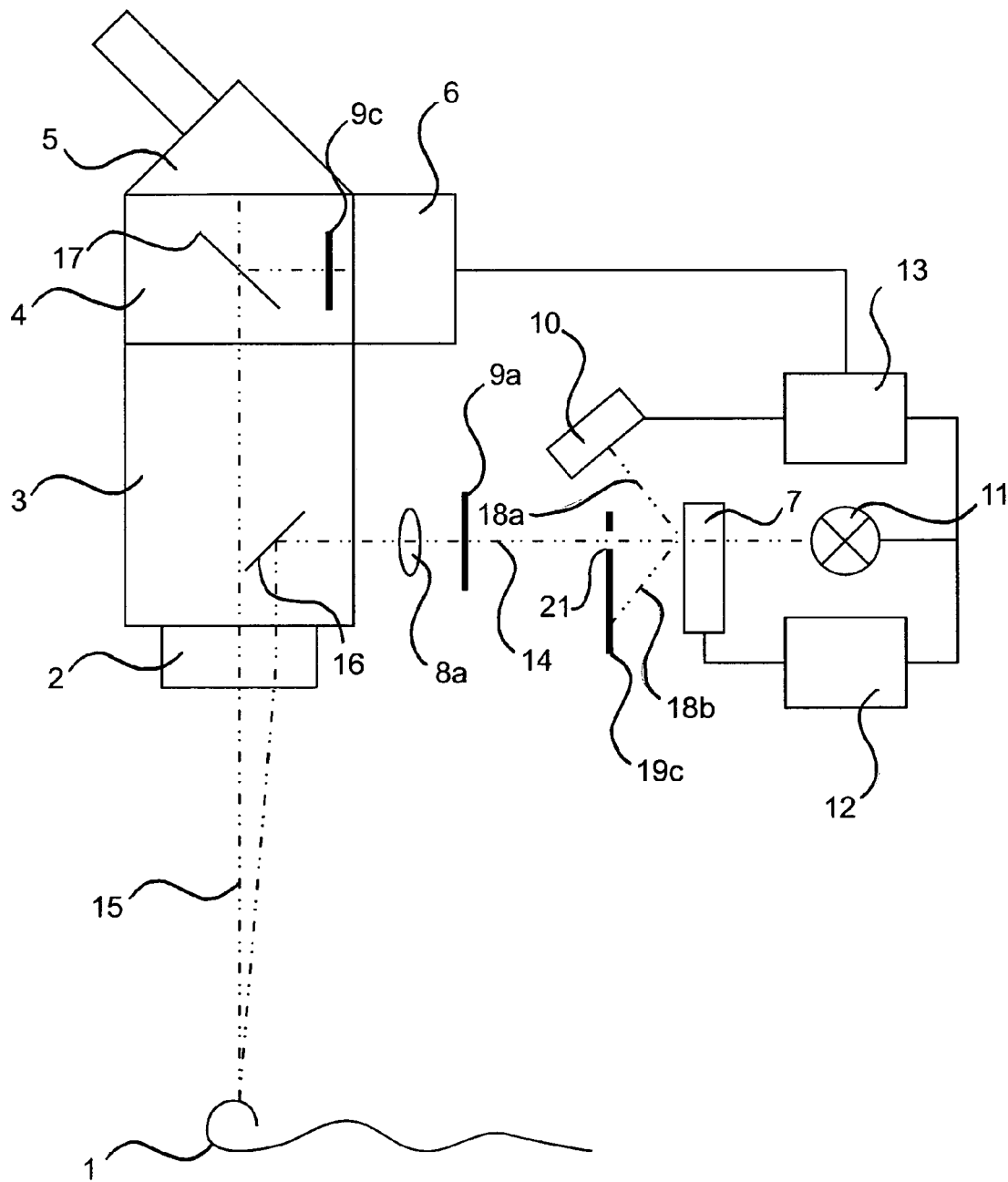
FIG. 4 shows the configuration according to FIG. 2 in which one symmetrical half of the diffracted beams is annihilated and the other is provided for controlling and reflecting image information into the surgical microscope.

FIG. 4 depicts a further aspect of the invention. Beams of +/- first order 18a or 18b can also be used as information carriers. They are an indication of the attenuation of input beam $I_{input}$. If the +/- first-order beam is conveyed to a sensor 10, the attenuation actually present can be measured and can be displayed by way of an electronic processing system 13 on a display 6, or can also be reflected into surgical microscope 3, using deflection element 17, in an information overlay apparatus 4.

Information display can be switched off by way of a shutter 9c or an electronic shutoff system or by pivoting deflection element 17 out.

Also depicted in FIG. 4 is a variant embodiment of the invention that dispenses with the additional direct illumination presented in FIG. 3. This is implemented by the fact that absorber 19c is configured in such a way that it absorbs the first-order beam having axis 18b.

Figure 5:
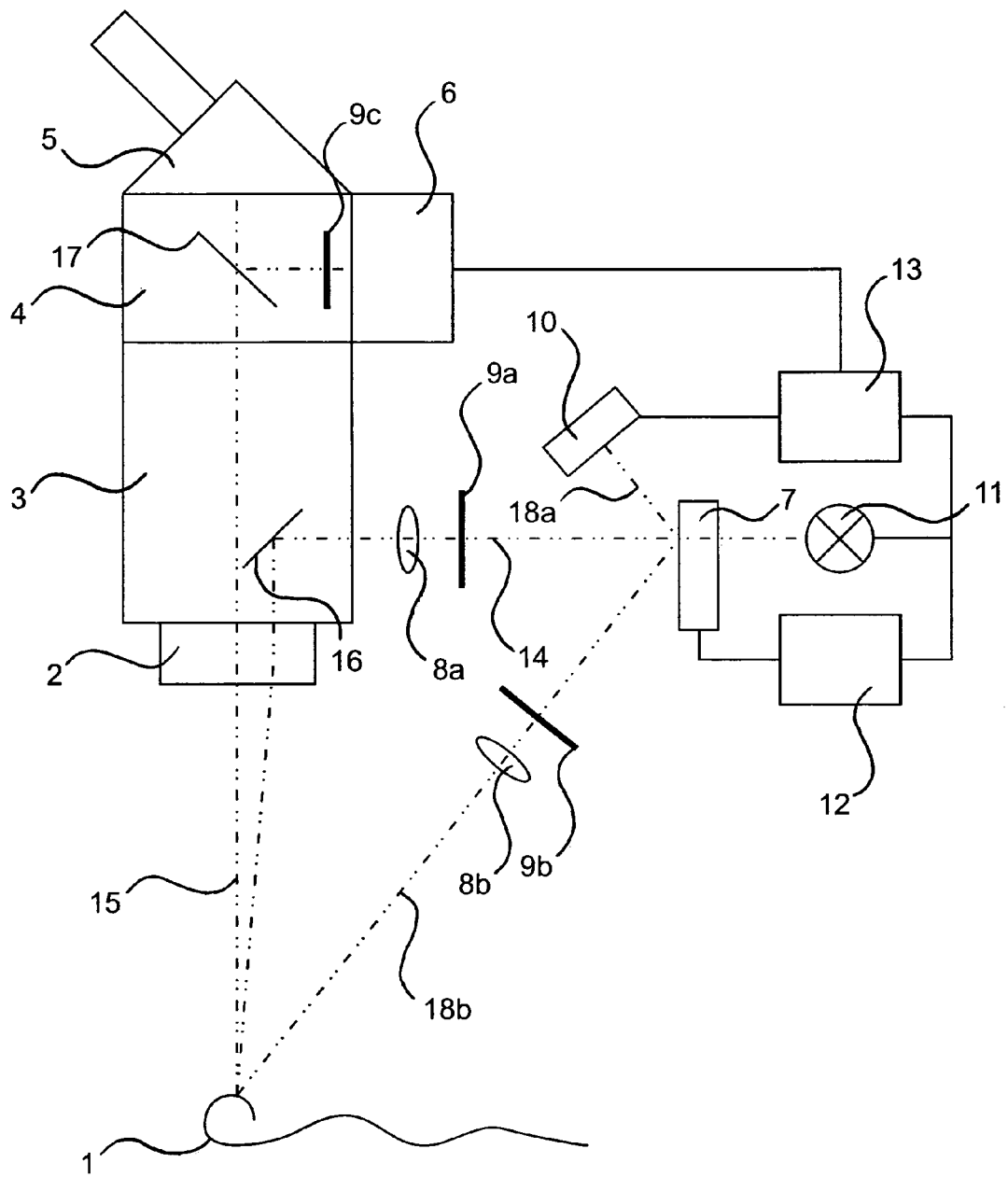
FIG. 5 shows a combined configuration according to FIGS. 3 and 4.

FIG. 5 shows a preferred embodiment of the invention in which the embodiments of FIG. 3 and FIG. 4 are combined with one another.

| PARTS LIST | |
|---|---|
| 1 | Object or object field |
| 2 | Main objective |
| 3 | Surgical microscope body, surgical microscope |
| 4 | Information overlay apparatus |
| 5 | Tube with eyepieces |
| 6 | Display |
| 7 | Diffractive element |
| 8a, b | Illuminating optical system |
| 9a, b, c | Shutters |
| 10 | Sensor |
| 11 | Laser light source |
| 12 | Driving system of (7) |
| 13 | Electronic data processing system |
| 14 | Axis of (2) |
| 15 | Axis of (2) |
| 16 | Deflection element for zero-order illumination through (2) |
| 17 | Deflection element for data overlay |
| 18a, b | Axis of +/- first-order illumination |
| 19a, b, c | Absorbers |
| 20 | Control system |
| 21 | Opening |
| 22a, b, c | Connecting leads |

What is claimed is:

1. A surgical microscope comprising:
   a main objective for viewing an object field;
   a laser light source emitting a laser beam;
   a diffractive element arranged after the laser light source for splitting the laser beam into a zero-order beam and a pair of first-order beams;
   a deflection element arranged after the diffractive element and before the main objective to receive the zero-order beam from the diffractive element and direct the zero-order beam through the main objective to non-destructively illuminate the object field;

a sensor arranged to measure the intensity of one of the pair of first-order beams, wherein the measured first-order beam has not interacted with an object being observed, to provide information regarding the intensity of the zero-order beam and the intensity of the other of the pair of first-order beams; and an eyepiece tube through which the object field illuminated by the zero-order beam is visually observed by a user of the surgical microscope.

2. The surgical microscope as defined in claim 1, further comprising an electronic data processing system connected to the laser light source for driving the laser light source, wherein the sensor is connected to the electronic data processing system.

3. The surgical microscope as defined in claim 2, wherein the diffractive element is controllable to adjust the intensity of the zero-order beam.

4. The surgical microscope as defined in claim 3, further comprising an electronic driving system for driving the diffractive element, wherein the electronic driving system is connected to the electronic data processing system and the electronic data processing system controls the electronic driving system.

5. The surgical microscope as defined in claim 3, wherein the diffractive element is a diffractive variable beam attenuator.

6. The surgical microscope as defined in claim 1, further comprising a display device connected to the sensor for displaying a measured intensity.

7. The surgical microscope as defined in claim 6, further comprising a data overlay deflection element arranged to deflect an image of the display device into an observation beam path of the surgical microscope.

8. The surgical microscope as defined in claim 1, further comprising a first illuminating optical system arranged after the diffractive element for widening and imaging the zero-order beam.

9. The surgical microscope as defined in claim 8, wherein the first illuminating optical system is corrected only for the light wavelength of the laser light source.

10. The surgical microscope as defined in claim 8, further comprising a second illuminating optical system arranged after the diffractive element for receiving the other first-order beam.

11. The surgical microscope as defined in claim 10, wherein the second illuminating optical system images the other first-order beam obliquely onto the object field.

12. A surgical microscope comprising:

a main objective for viewing an object field;

a laser light source emitting a laser beam;

a diffractive element arranged after the laser light source for splitting the laser beam into a zero-order beam and a pair of first-order beams;

a deflection element arranged after the diffractive element and before the main objective to receive the zero-order beam from the diffractive element and direct the zero-order beam through the main objective to non-destructively illuminate the object field; and an illuminating optical system arranged after the diffractive element for imaging one of the pair of first-order beams obliquely onto the object field along a direct path bypassing the main objective.

13. The surgical microscope as defined in claim 12, further comprising another illuminating optical system arranged after the diffractive element for widening and imaging the zero-order beam.

14. The surgical microscope as defined in claim 12, further comprising a scanning device arranged after the diffractive element for scanning the zero-order beam over the object field.

15. The surgical microscope system as defined in claim 12, further comprising at least one absorber arranged after the diffractive element to receive the other of the pair of first-order beams.

16. The surgical microscope as defined in claim 12, further comprising a shutter after the diffractive element for blocking the zero-order beam in pulsed fashion.

17. The surgical microscope as defined in claim 12, further comprising a shutter after the diffractive element for blocking the one first-order beam in pulsed fashion.

* * * * *